United States Patent
King et al.

(10) Patent No.: US 10,974,351 B2
(45) Date of Patent: Apr. 13, 2021

(54) REVERSIBLE WELD TORCH TROLLEY

(71) Applicant: HMT LLC, The Woodlands, TX (US)

(72) Inventors: Richard Paul King, Magnolia, TX (US); Timothy Kyle Johnston, Houston, TX (US)

(73) Assignee: HMT LLC, The Woodlands, TX (US)

( * ) Notice: Subject to any disclaimer, the term of this patent is extended or adjusted under 35 U.S.C. 154(b) by 275 days.

(21) Appl. No.: 15/940,643

(22) Filed: Mar. 29, 2018

(65) Prior Publication Data

US 2018/0281122 A1    Oct. 4, 2018

Related U.S. Application Data

(60) Provisional application No. 62/479,078, filed on Mar. 30, 2017.

(51) Int. Cl.
*B23K 37/047*    (2006.01)
*B23K 9/28*    (2006.01)
*B23K 37/02*    (2006.01)
*B23K 37/053*    (2006.01)
*B23K 101/12*    (2006.01)

(52) U.S. Cl.
CPC .............. *B23K 37/047* (2013.01); *B23K 9/28* (2013.01); *B23K 37/0223* (2013.01); *B23K 37/0247* (2013.01); *B23K 37/0538* (2013.01); *B23K 2101/12* (2018.08)

(58) Field of Classification Search
CPC .. B23K 37/047; B23K 37/02; B23K 37/0211; B23K 37/0217; B23K 37/0223; B23K 37/0229; B23K 37/0241; B23K 37/0282
See application file for complete search history.

(56) References Cited

U.S. PATENT DOCUMENTS

| 2,254,792 | A | * | 9/1941 | Brown | B23K 9/0282 |
|---|---|---|---|---|---|
| | | | | | 228/234.1 |
| 3,072,779 | A | * | 1/1963 | Masters | B23K 9/1274 |
| | | | | | 219/124.31 |
| 3,167,636 | A | * | 1/1965 | Bosteels | B23K 9/025 |
| | | | | | 219/124.22 |
| 6,722,842 | B1 | * | 4/2004 | Sawdon | B23K 37/0452 |
| | | | | | 414/729 |
| 2006/0144835 | A1 | * | 7/2006 | Pan | B23K 9/1274 |
| | | | | | 219/124.34 |
| 2009/0020970 | A1 | * | 1/2009 | Klein | B23K 37/0282 |
| | | | | | 280/47.35 |

OTHER PUBLICATIONS

U.S. Appl. No. 15/796,492, filed Oct. 27, 2017, Richard Paul King.

* cited by examiner

*Primary Examiner* — Erin E McGrath
(74) *Attorney, Agent, or Firm* — Fletcher Yoder, P.C.

(57) ABSTRACT

A trolley includes a body and a side block coupled to the body via a pivot arm and a spring. An adjustment knob adjusts a position of the side block relative to the body. A first plurality of rollers are coupled to the body and roll along a first roller recess on a first side of a length of a cap channel. A second plurality of rollers are coupled to the side block and roll along a second roller recess on a second side of the length of the cap channel. A first welding torch bracket positions a welding torch at a first interface between the first side of the length of the cap channel and a first deck sheet as the trolley traverses the length of the cap channel.

18 Claims, 12 Drawing Sheets

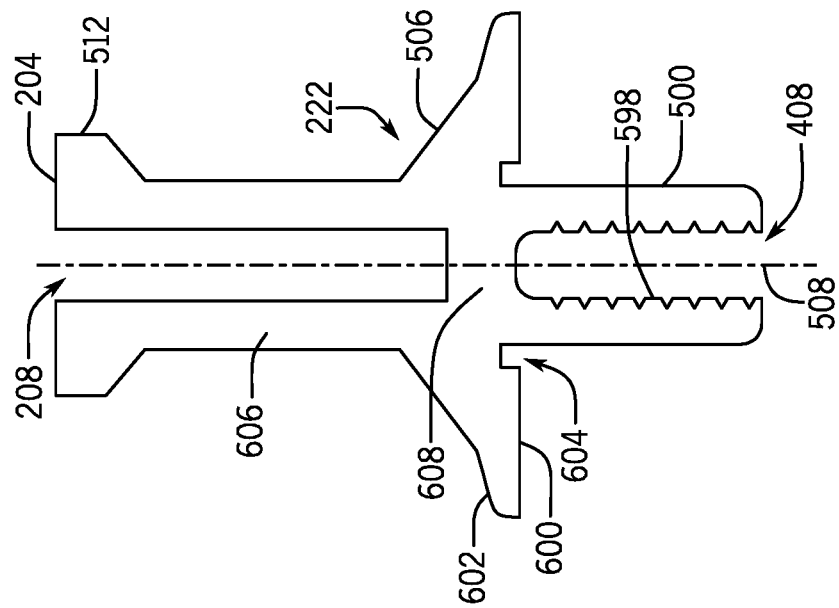
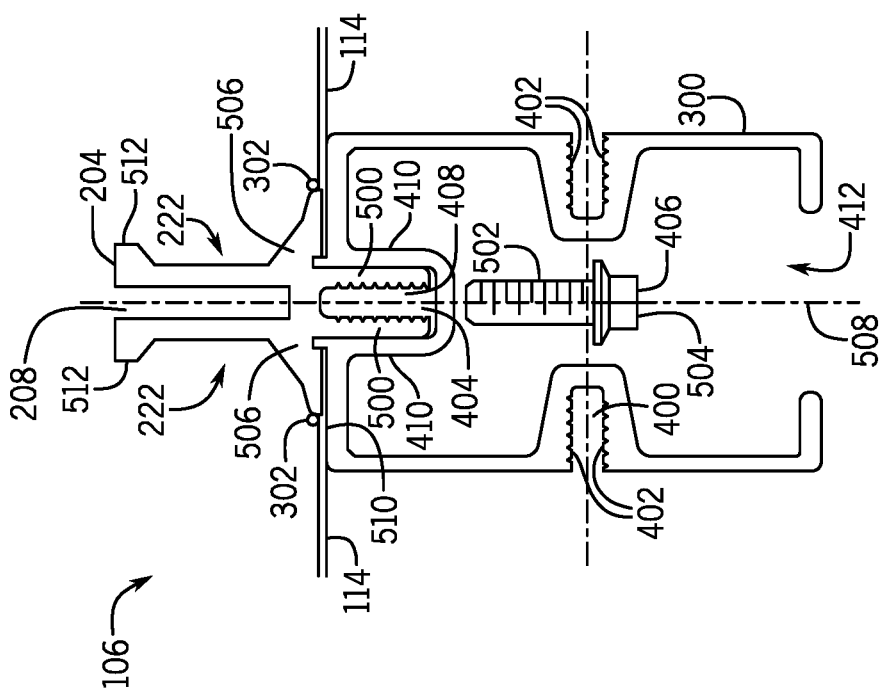

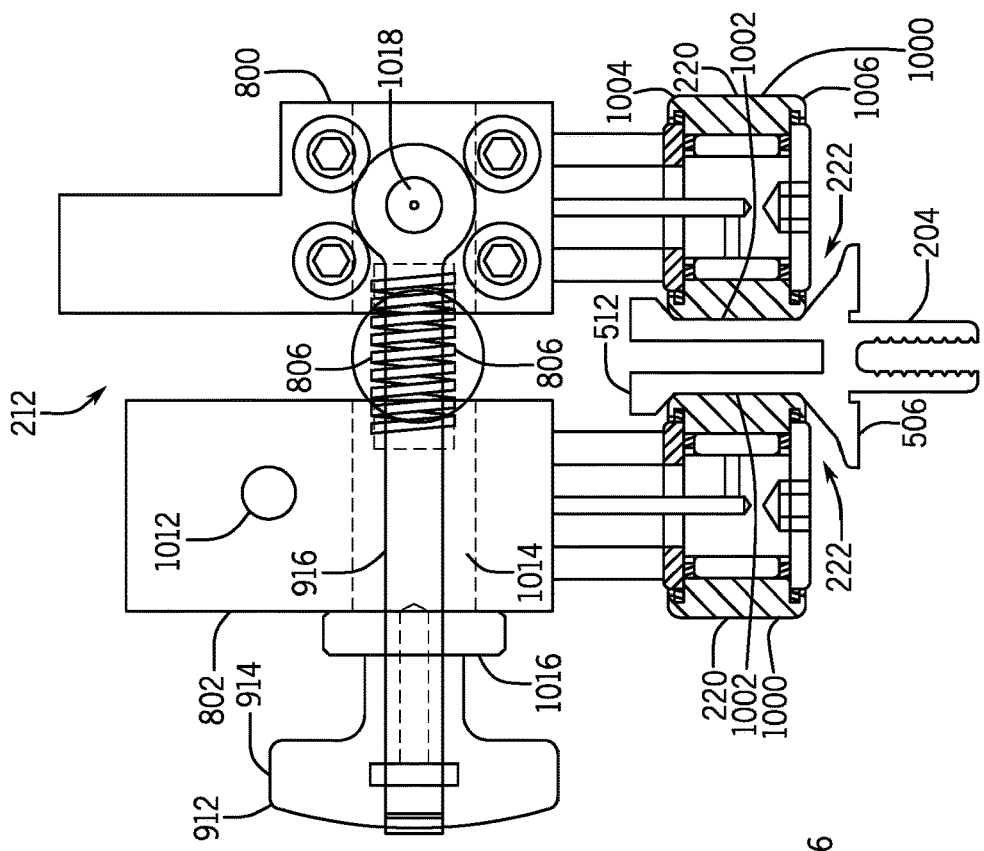
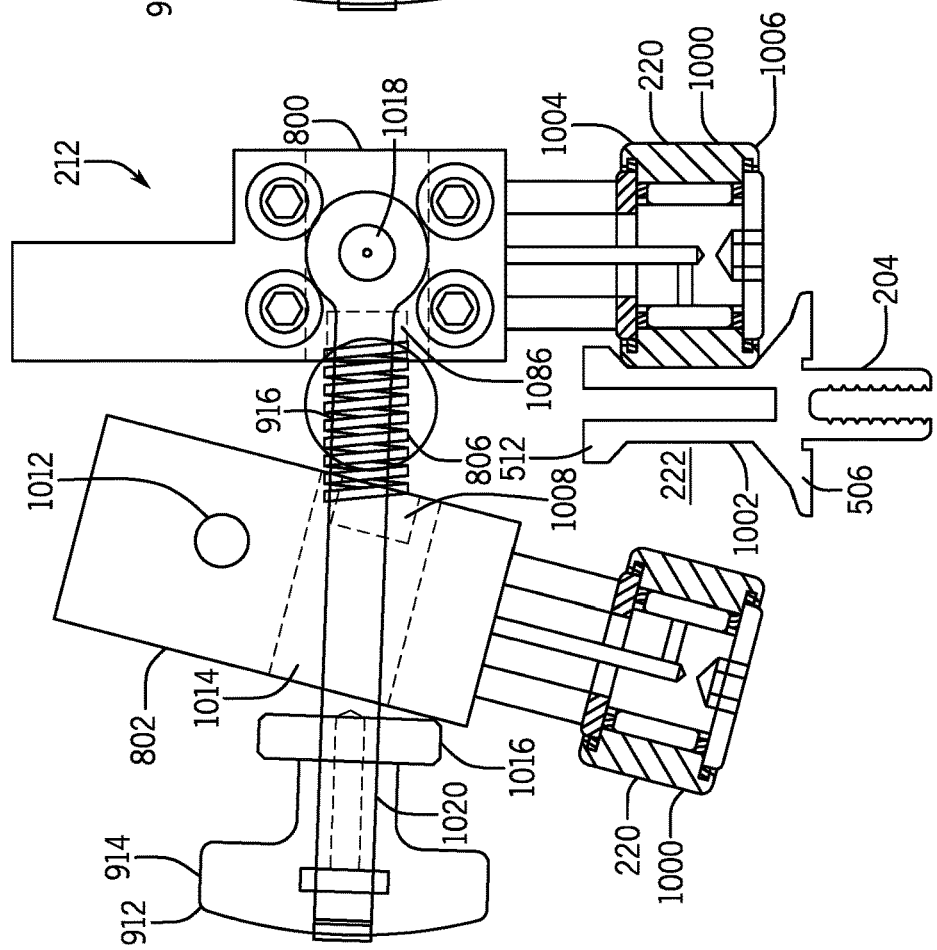

REVERSIBLE WELD TORCH TROLLEY

CROSS REFERENCE TO RELATED APPLICATION

This application claims priority to and benefit of U.S. Provisional Patent Application No. 62/479,078, entitled "REVERSIBLE WELD TORCH TROLLEY," filed Mar. 30, 2017, which is herein incorporated by reference in its entirety.

BACKGROUND

The present disclosure relates generally to assembling internal floating roofs for liquid storage tanks. More specifically, the present disclosure relates to techniques for welding seams between deck sheets or skins to reduce emissions from liquid storage tanks having internal floating roofs.

This section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Above ground storage tanks are frequently used to store industrial quantities of a variety of raw and finished materials. These storage tanks may contain liquids, gases, solids, or some combination thereof and are used in a variety of industries. For example, the oil and gas industry frequently uses above ground storage tanks to store refined hydrocarbon products. Additionally, above ground storage tanks are also common in the petrochemical, pharmaceutical, cosmetics, food, and consumer products industries.

A variety of storage tanks may be used across all industries. For example, a storage tank may be cylindrically shaped with a fixed roof. The fixed roof, as opposed to an open top storage tank (e.g., a hopper), has the benefit of minimizing evaporation of liquid product in the tank. Moreover, a fixed roof limits contamination of the stored product by keeping foreign matter (e.g., water, dust, etc.) out of the tank.

An internal floating roof (i.e., a roof that floats on the surface of the stored product as a level of the stored product rises and falls) may further reduce emissions of the storage tank. Conventional floating roofs include panels that are affixed to pontoons and bolted together, forming bolted seams. However, liquid, gas, or fluid vapor may pass through bolted seams in the internal floating roof.

Though welding deck seams of a floating roof may help to reduce emissions, welding machines used to weld seams of a floating roof may be heavy, causing the surface of the floating roof to flex as the welding machine traverses the roof. The flexing may result of movement of the components being welded relative to one another, affecting the quality of the weld. Further, flexing of the roof under the load of the welding machine may create difficulties in maintaining alignment of a welding torch of the welding machine.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a welding system includes a welding machine, a trolley, and a coupling rod extending between the welding machine and the trolley and coupled to the welding machine and the trolley via first and second respective ball and socket interfaces. The welding machine includes a first welding torch that welds a first deck sheet to a length of a cap channel, a plurality of guide wheels that roll along a top channel of the length of the cap channel, and a drive wheel configured to roll along the first deck sheet and to propel the welding machine along the length of the cap channel. The trolley includes a body and a side block coupled to the body via a pivot arm and a spring. A first plurality of rollers are coupled to the body and roll along a first roller recess on a first side of the length of the cap channel. A second plurality of rollers are coupled to the side block and roll along a second roller recess on a second side of the length of the cap channel. An adjustment knob adjusts a position of the side block relative to the body. A first welding torch bracket positions the first welding torch to perform a first weld at a first interface between the first side of the length of the cap channel and the first deck sheet as the welding system traverses the length of the cap channel.

In another embodiment, a trolley includes a body and a side block coupled to the body via a pivot arm and a spring. An adjustment knob adjusts a position of the side block relative to the body. A first plurality of rollers are coupled to the body and roll along a first roller recess on a first side of a length of a cap channel. A second plurality of rollers are coupled to the side block and roll along a second roller recess on a second side of the length of the cap channel. A first welding torch bracket positions a welding torch at a first interface between the first side of the length of the cap channel and a first deck sheet as the trolley traverses the length of the cap channel. A socket recess block having a recess receives a ball of a coupling rod, wherein the coupling rod couples the trolley to a welding machine.

In a further embodiment, a method, includes coupling a trolley to a length of a cap channel coupling a welding machine to the length of the cap channel, and coupling the trolley to the welding machine via a rod extending between first and second ball and socket interfaces. Coupling the trolley to the length of the cap channel include aligning a first plurality of rollers coupled to a body of the trolley with a first roller recess on a first side of the length of the cap channel, rotating an adjustment knob to move a second plurality of rollers coupled to a side block toward the first plurality of rollers until the second plurality of rollers align with a second roller recess on a second side of the length of the cap channel, wherein the side block and the body are coupled to one another via a pivot arm and a spring. Coupling a welding machine to the length of the cap channel include placing a guide wheel of the welding machine within a top channel of the length of the cap channel, and placing a drive wheel of the welding machine on a first deck sheet.

BRIEF DESCRIPTION OF THE DRAWINGS

Various aspects of this disclosure may be better understood upon reading the following detailed description and upon reference to the drawings in which:

FIG. 5 is a front section view of an embodiment of an interface between a girder, the cap channel, and the deck sheets, in accordance with aspects of the present disclosure;

FIG. 6 is a front section view of an embodiment of the cap channel of FIG. 5, in accordance with aspects of the present disclosure;

FIG. 11 is a front section view of an embodiment of the trolley in an open position, in accordance with aspects of the present disclosure;

FIG. 12 is a front section view of an embodiment of the trolley in a closed position, in accordance with aspects of the present disclosure;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more elements. The terms "comprising," "including," and "having" are intended to be inclusive and mean that there may be additional elements other than the listed elements.

The disclosed techniques include techniques for welding deck seams of an internal floating roof for a storage tank. The internal floating roof includes a rim and a plurality of girders coupled to one another in a pattern interior of the rim. A plurality of pontoons may be coupled to the girders to provide buoyancy for the internal floating roof, thereby enabling the internal floating roof to float on a surface of the product in the storage tank. A plurality of deck sheets or deck sheets or skins may be positioned on top of the girders such that the edges of the deck sheets extend substantially parallel to a top channel of respective girders. A cap channel may be inserted into the top channel of each of the respective girders and secured via one or more bolts. The cap channel includes feet that contact the edges of the deck sheets, thereby capturing the deck sheets between the feet of the cap channel and the top surface of the respective girder. A welding system, including a welding machine and a trolley, may then engage with the cap channel to align itself and weld the deck sheet to the cap channel. The welded seam creates a partially, substantially, or completely fluid-tight and/or air-tight seal that restricts the flow of product or product vapor through the floating roof, thus reducing product emissions through the roof relative to a floating internal roof with bolted deck seams.

Figure 1:
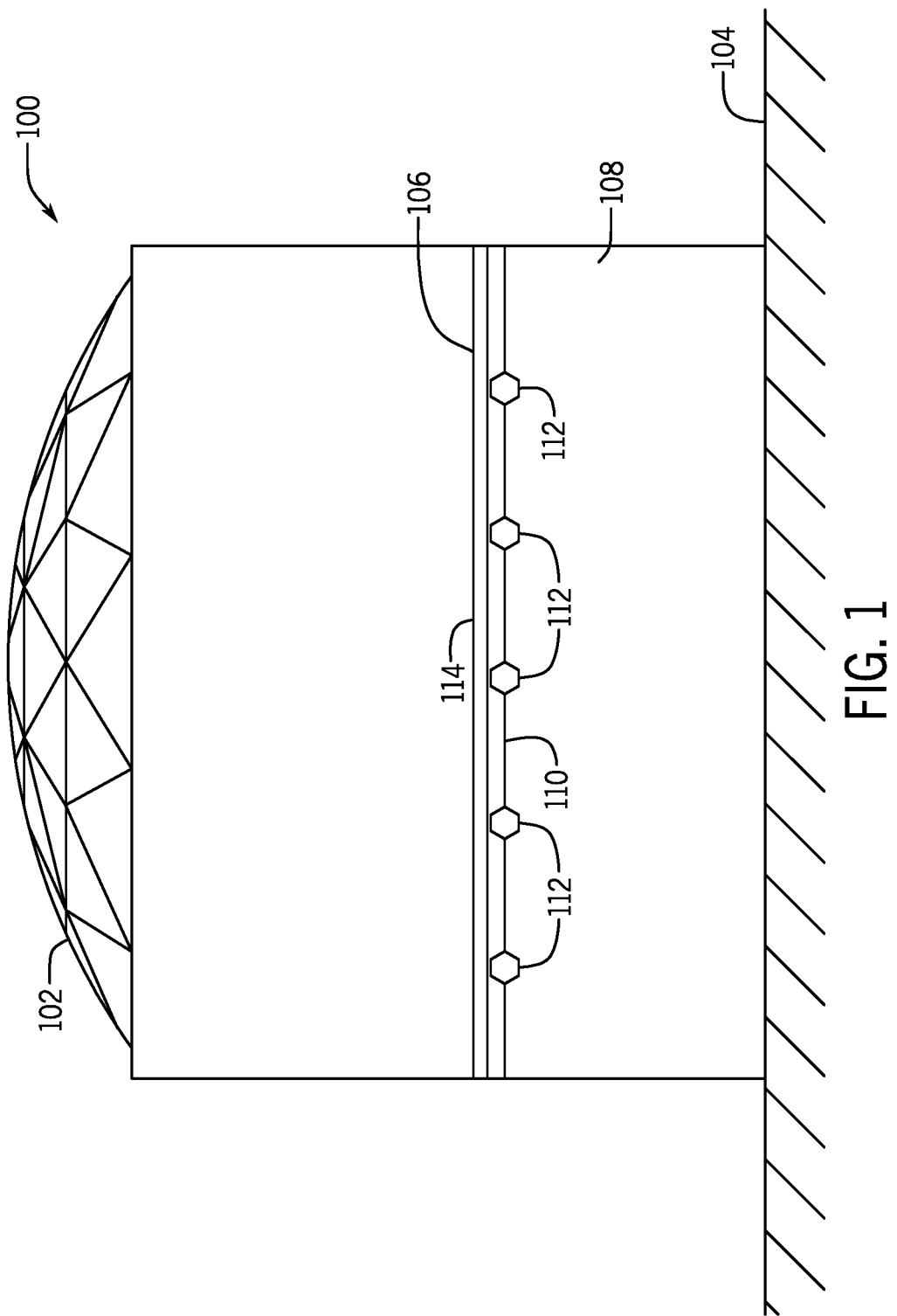
FIG. 1 is a side view of an embodiment of a storage tank, in accordance with aspects of the present disclosure.

Referring now to FIG. 1, a side view of a storage tank 100 is shown. The storage tank 100 may be a cylindrical storage tank with a dome roof 102. Though the dome roof 102 is shown in FIG. 1, it should be understood that the disclosed techniques may be used in other applications (e.g., flat roofs, open roofs, etc.). In the illustrated embodiment, the storage tank 100 is positioned on a surface 104 (e.g., a concrete foundation, the ground, a structural base, etc.) and is equipped with an internal floating roof 106. The storage tank 100 may contain some type of material or product 108. The product 108 may be hydrocarbons, synthetic chemicals, water, or any other type of substance capable of being stored in the storage tank 100. Moreover, the product 108 may be a gas, liquid, solid, or some combination thereof (hereinafter referred to generally as "fluid"). Additionally, the storage tank 100 may also include other additional components that are not shown in FIG. 1.

As illustrated, the floating roof 106 includes a support structure 110, a plurality of floatation devices (e.g., pontoons 112), and a plurality of deck sheets 114. The support structure 11, may include, for example, a circular rim that defines an outer circumference of the floating roof 106, and a plurality of girders coupled to the rim and/or coupled to one another (e.g., via brackets). The girders may be arranged in a generally grid-like pattern. For example, a first plurality of girders may be arranged end-to-end, spanning across the rim in a first direction, and second plurality of girders may be arranged in a second direction, perpendicular to the first direction, and offset from one another, spanning between adjacent sets of the first plurality of girders. In other embodiments, the girders may be arranged in different patterns, perpendicular or oblique to one another. For example, the girders may connect to one another to form triangles, pentagons, hexagons, octagons, or some other polygon.

The pontoons 112 may be coupled to the rim and/or the girders to provide buoyancy for the floating roof 106. The buoyancy of the pontoons 112 enables the floating roof 106 to float on the surface of the product 108. The plurality of deck sheets 114 may be coupled to the top of the support structure 110 (e.g., via a clamped or bolted interface). Each of the plurality of deck sheets 114 may be welded along seams (e.g., edges between adjacent deck sheets or skins) in order to reduce emissions of the product 108 through the floating roof 106. Welding the deck sheets 114 (e.g., welded deck seams) may make the interface between the deck sheets 114 and the support structure 110 partially, substantially, or completely air-tight and/or fluid-tight. Accordingly, welded deck seams restrict the flow of product 108 vapor through the floating roof, resulting in reduced emissions.

Figure 2:
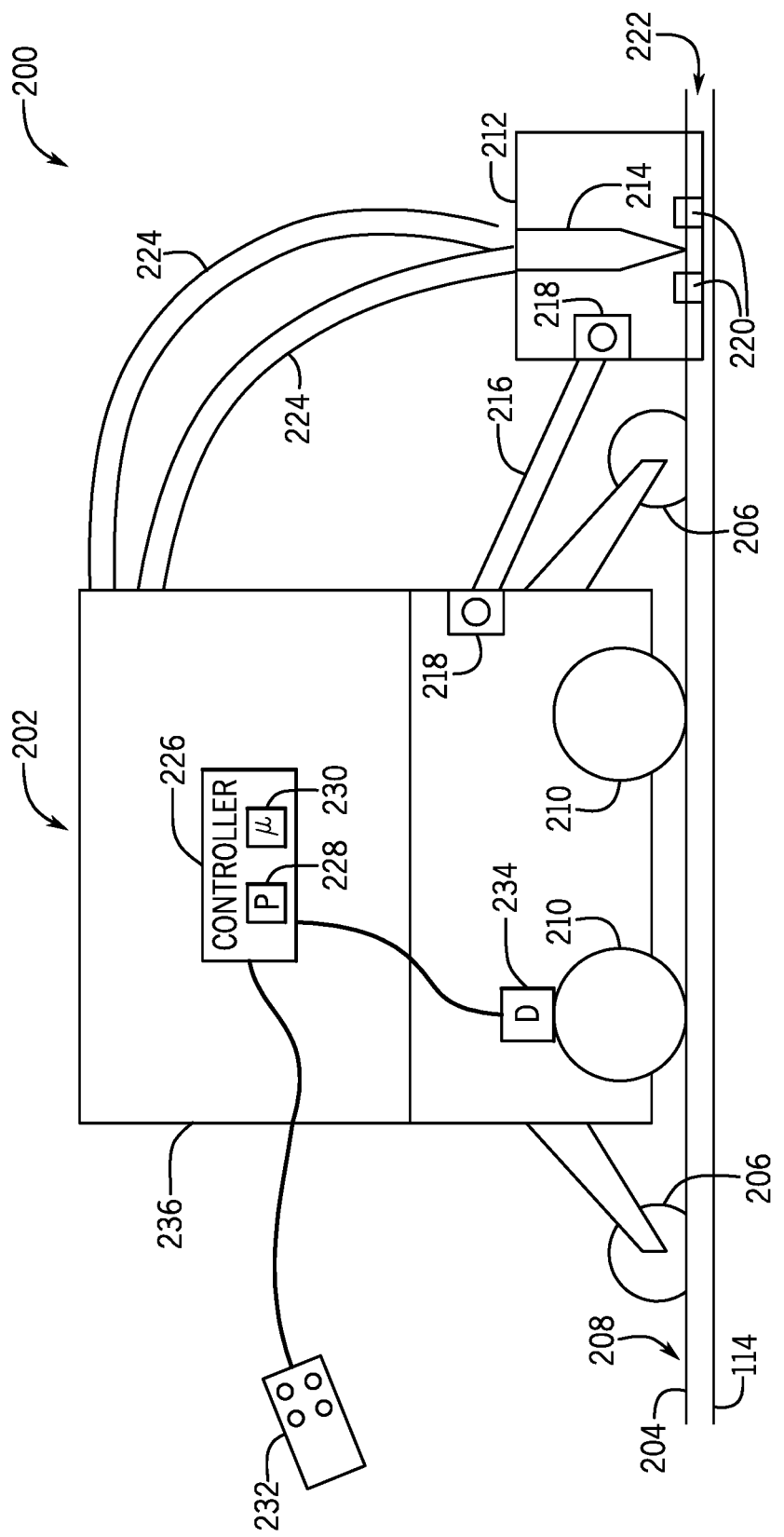
FIG. 2 is a side view of an embodiment of a welding system traversing a cap channel of a floating roof, welding a deck sheet to the cap channel, in accordance with aspects of the present disclosure.

FIG. 2 is a side view of a welding system 200, including a welding machine 202, traversing a cap channel 204, welding (e.g., laying a weld bead that couples) the deck sheet 114 to the cap channel 204. As shown, the welding machine 202 may include guide wheels 206 configured to fit inside, and roll along, a top channel 208 of the cap channel 204. The welding machine 202 may also include drive wheels 210, which may contact the deck sheets 114 and/or the cap channel 204 and propel the welding machine 202 along the cap channel 204.

In the illustrated embodiment, the welding system 200 includes a trolley 212, which may include one or more welding torches 214 configured to weld the deck sheet 114 to the cap channel 204. The trolley 212 may be coupled to the welding machine 202 via a rod 216 that couples to each of the welding machine 202 and the trolley 212 via a ball and socket interface 218. The trolley 212 also includes one or more rollers 220 configured to couple to the cap channel 204 by fitting into roller recesses 222 on either side of the cap channel 204. One or more weld cables 224 may extend from the welding machine 202 to the welding torches 214 on the trolley to provide power and welding consumables (e.g., wire, shielding gas, etc.) for the welding operation.

In some embodiments, the welding machine 202 may include a controller 226, which may itself include a processor 228 and a memory 230. The controller 226 may control welding power and/or welding consumables output to the welding torches 214 via the welding cables 224. In some embodiments, the controller 226 may also control a drive mechanism 234 that causes the drive wheels 210 to rotate. The welding machine may also include a pendant 232 coupled to the controller 226, by which an operator may control the operation of the welding machine 202. The pendant 232 may be configured to couple to a housing 236 of the welding machine 202 (e.g., via a clipping, magnetic, hook and loop, or some other kind of interface) when not in use. In some embodiments, the welding machine 202 may traverse the cap channel 204 a first time to lay a first weld bead on a first side of the cap channel 204, and then traverse the cap channel 204 a second time to lay a second weld bead on a second side of the cap channel 204. In other embodiments, the welding machine may lay both weld beads while traversing the cap channel 204 a single time.

Figure 3:
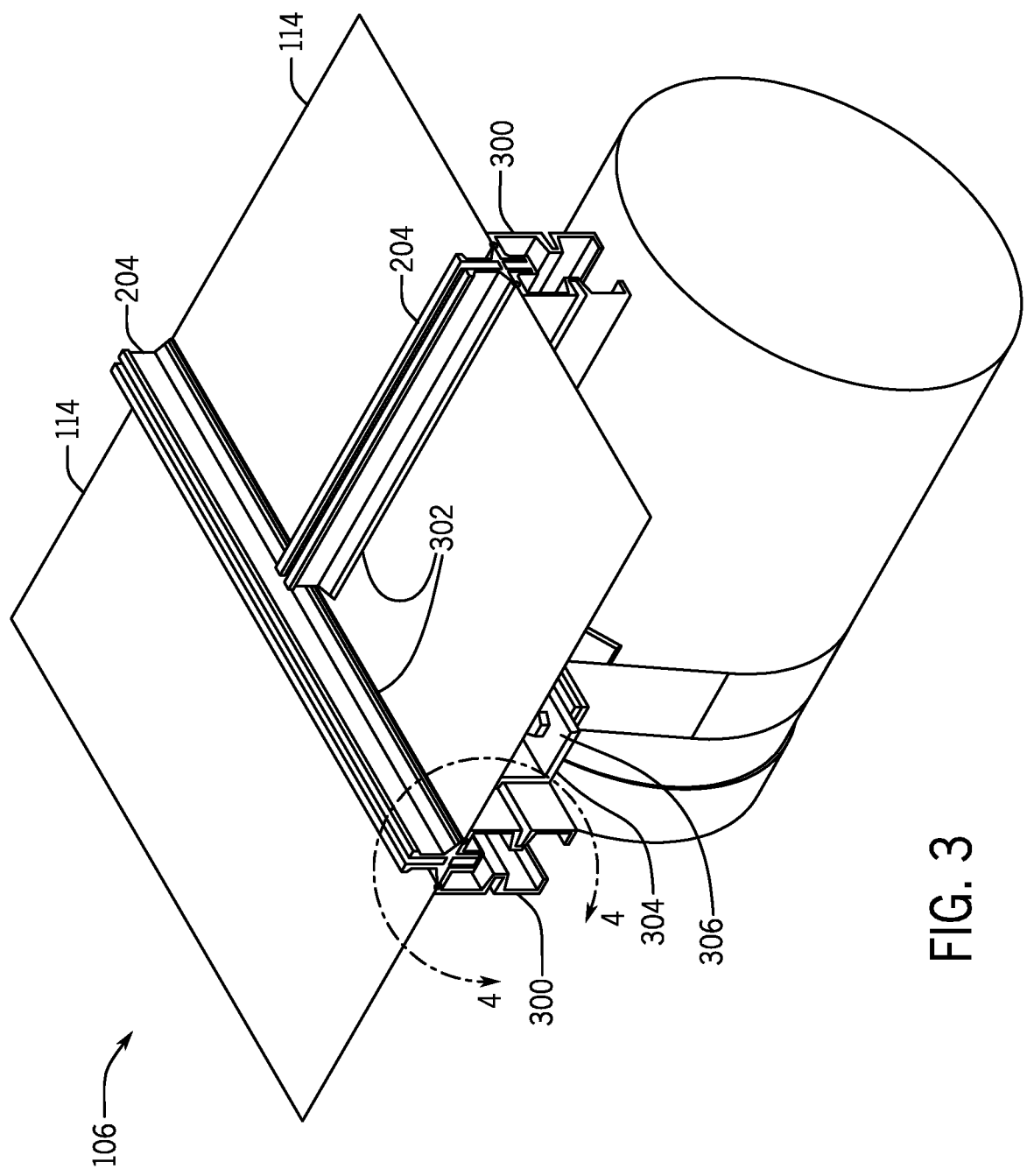
FIG. 3 is a perspective section view of an embodiment of a portion of a floating roof of the storage tank of FIG. 1, in accordance with aspects of the present disclosure.

FIG. 3 is a perspective section view of a portion of an embodiment of the internal floating roof 106 of FIG. 1. As illustrated, first and second girders 300 are disposed substantially perpendicular to one another (e.g., held in place by a bracket). The deck sheets 114 are disposed on top of the girders 300. First and second cap channels 204 couple to the girders 300 via a bolted interface and capture the deck sheets 114 by capturing the edges of the deck sheets 114 against top surfaces of the girders 300. A weld bead 302 is formed at the interface of the cap channel 204 and the deck sheets 114, forming a fluid-tight or air-tight seal between the cap channels 204 and the deck sheets 114, thereby resulting in welded deck seams. The partially, substantially, or completely fluid-tight or air-tight seal between the cap channels 204 and the deck sheets 114 may restrict the flow of product through the floating roof 106, thus reducing emissions across the floating roof 106. As illustrated, a pontoon strap 306 couples the pontoon to the girders 300 via a bracket 304.

Figure 4:
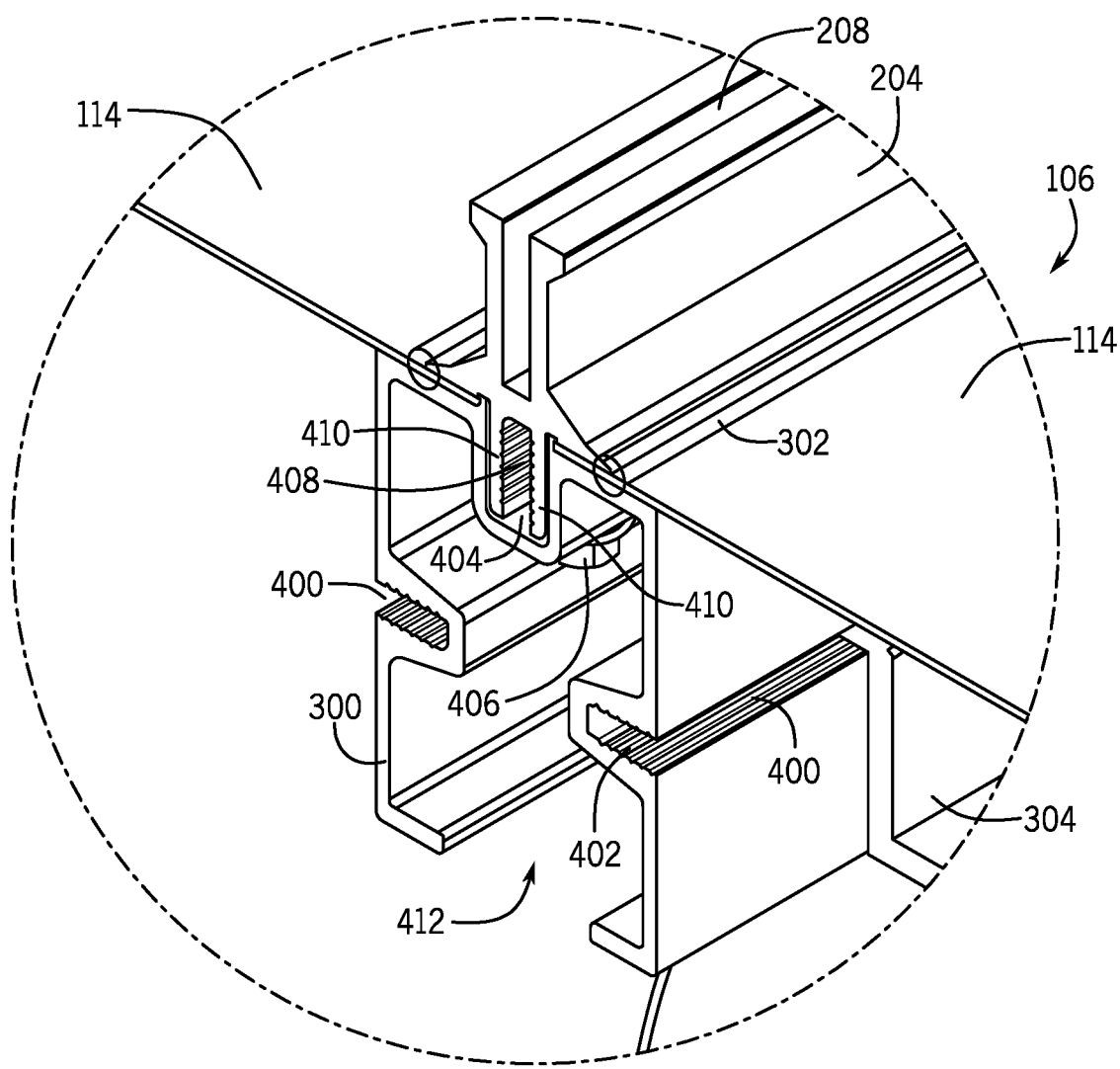
FIG. 4 is a detail perspective section view of an embodiment of the floating roof, taken within line 4-4 of FIG. 3, in accordance with aspects of the present disclosure.

FIG. 4 is a detail perspective section view of the floating roof 106, taken within line 4-4 of FIG. 3. As shown, the girder 300 has side channels 400 on opposite sides of the girder 300. In some embodiments, sidewalls 402 of the side channels 400 may have teeth configured to interface with the threads of a bolt, such that components (e.g., bracket 304) may be coupled to the girder 300. In other embodiments, the side channels 400 may be configured to be self-tapping. That is, the material of the sidewalls 402 may be malleable, such that the threads of the bolt dig into the sidewalls 402 to hold the bolt in place. The top of the girder 300 includes a top channel 404 having a generally rectangular cross-section. The top channel 404 may include multiple bolt holes (e.g., apertures) along the length of the girder 300 configured to receive a respective bolt 406. The cap channel 204 includes a bottom channel 408 and the top channel 208. The bottom channel 408 is defined on either side by legs 410. The legs 410 are configured to fit within the top channel 404 of the girder 300, such that the bottom channel 408 of the cap channel 204 faces the top channel 404 of the girder 300. The bolt 406 extends through the aperture in the top channel 404 and interfaces with the interior surfaces of the legs 410. As with the sidewalls 402 of the girder 300, the interior surfaces of the legs 410 of the cap channel may have teeth configured to interface with the threads of a bolt 406, or the interior surfaces of the legs 410 may be self-tapping. As the bolt 406 is tightened, the cap channel 204 is brought further and further into the top channel 404 of the girder 300, capturing the deck sheets 114 against the top surface of the girder 300. A weld bead 302 may be formed at the interface of the deck sheets 114 and the cap channel 204. A bottom channel 412 of the girder 300 is generally open to provide access to the bolt 406.

FIG. 5 is a front section view of the interface between the girder 300, the cap channel 204, and the deck sheets 114. As shown, the bottom channel 408 of the cap channel 204 is defined by legs 500. The interior surface of each leg 500 may include teeth configured to interface with threads 502 of the bolt 406. The bolt 406 extends through an aperture in the girder 300 and into the top channel 404 of the girder 300. The legs 500 of the cap channel 204 are inserted into the top channel 404 of the girder 300 such that the threads 502 of the bolt 406 interface with the legs 500 of the cap channel 204. As the bolt 406 is tightened (e.g., by rotating a head 504 of the bolt 406), the threads 502 engage the legs 500 of the cap channel 204 and pull the cap channel 204 further into the top channel 404 of the girder 300. The head 504 of the bolt 406 is accessible via the open bottom channel 412 of the girder 300. As the cap channel 204 is drawn into the top channel 404 of the girder 300, feet 506 of the cap channel 204, which extend outward from a central or vertical plane 508 of the cap channel 204, capture the adjacent deck sheets 114 against a top surface 510 of the girder 300, thereby holding the deck sheets 114 in place.

As previously described, the cap channel 204 includes the top channel 208. The cap channel 204 also includes roller recesses 222 on either side of the cap channel 204, which are configured to interface with the rollers of the welding system trolley to couple the trolley to the cap channel 204 and/or guide the automatic welding system relative to the cap channel 204. Protrusions 512 extend outward, opposite the roller recesses 222 from the feet 506, and run the length of the cap channel 204 to keep the rollers of the trolley engaged with the roller recesses 222. The welding system traverses the length of the cap channel 204 laying the weld beads 302 on either side of the cap channel 204 at the interface of the feet 506 and the deck sheets 114. In some embodiments, the welding machine may traverse the cap channel 204 a first time in a first direction to lay the first weld bead 302, and then traverse the cap channel 204 a second time in a second direction to lay the second weld bead 302. In other embodiments, the welding machine may lay both weld beads 302 on opposite sides of the cap channel 204 while traversing the cap channel 204 a single time.

FIG. 6 is a front section view of the cap channel 204 shown in FIG. 5. The cap channel 204 includes the legs 500, which define the bottom channel 408. The interior surfaces 598 of the legs 500 may include teeth, grooves, or texturing configured to interface with the threads 502 of the bolt. In other embodiments, the legs 500 may be made of a sufficiently soft material that the threads 502 of the bolt 406 engage with the interior surface 598 (e.g., self-tapping) as the bolt is installed. The feet 506 may extend outward in a first direction from the cap channel 204. A bottom surface 600 of each foot may be generally parallel to the top surface of the girder. In the illustrated embodiment, the top surface 602 of each foot 506 extends diagonally downward, oblique to the central vertical plane 508. However, in other embodiments, the top surface 602 may extend substantially perpendicular to the central vertical plane 508. As shown, the cap channel 204 may include a recess 604 where the bottom surface 600 of the foot 506 and the legs 500 meet, running the length of the cap channel 204. In some embodiments, the recess 604 may be configured to receive the protrusion of the girder when the cap channel 204 is installed on the girder. As previously discussed, in an installed configuration, the deck sheet is sandwiched between the top surface of the girder and the bottom surface 600 of the foot 506 of the cap channel 204. In some embodiments, the top surface of the girder, the bottom surface 600 of the cap channel 204, or both, may include teeth, grooves, knurling, texturing, etc. to improve grip and increase friction with the deck sheet. Similarly, in some embodiments, the deck sheet may include a textured finish to increase friction at the interface between the deck sheet, the girder, and the cap channel 204. The cap channel 204 includes the top channel 208, which is substantially rectangular in shape and defined by arms 606. A central rib 608 acts as the top of the bottom channel 408 and the bottom of the top channel 208.

The arms 606 include protrusions 512 that extend outward, away from the central vertical plane 508. The protrusions 512 define roller recesses 222 on either side of the cap channel 204, which are configured to interface with rollers of the trolley of the welding system to couple the trolley to the cap channel 204. The protrusions 512 and roller recesses 222 run the length of the cap channel 204 to keep the rollers of the welding machine engaged with the roller recesses 222. The welding system traverses the length of the cap channel 204, laying weld beads on either side of the cap channel 204, at the interface of the feet 506 and the deck sheets. In some embodiments, the welding machine may traverse the cap channel 204 the first time in the first direction to lay the first weld bead, and then traverse the cap channel 204 the second time in the second direction to lay the second weld bead. In other embodiments, the welding machine may lay both weld beads while traversing the cap channel 204 a single time. As with the girder, the cap channel 204 may be made of an extruded metal, such as aluminum. However, in other embodiments, the cap channel 204 may be fabricated from other metals (e.g., steel, stainless steel, iron, copper, titanium, brass, etc.), or other classes of materials, such as polymers. Further, other fabrication techniques, such as molding, machining, casting, 3D printing, etc., or a combination thereof may be used to fabricate the cap channel 204. Further, the girder and the cap channel 204 may or may not be manufactured by the same material and/or by the same or similar processes.

Figure 7:
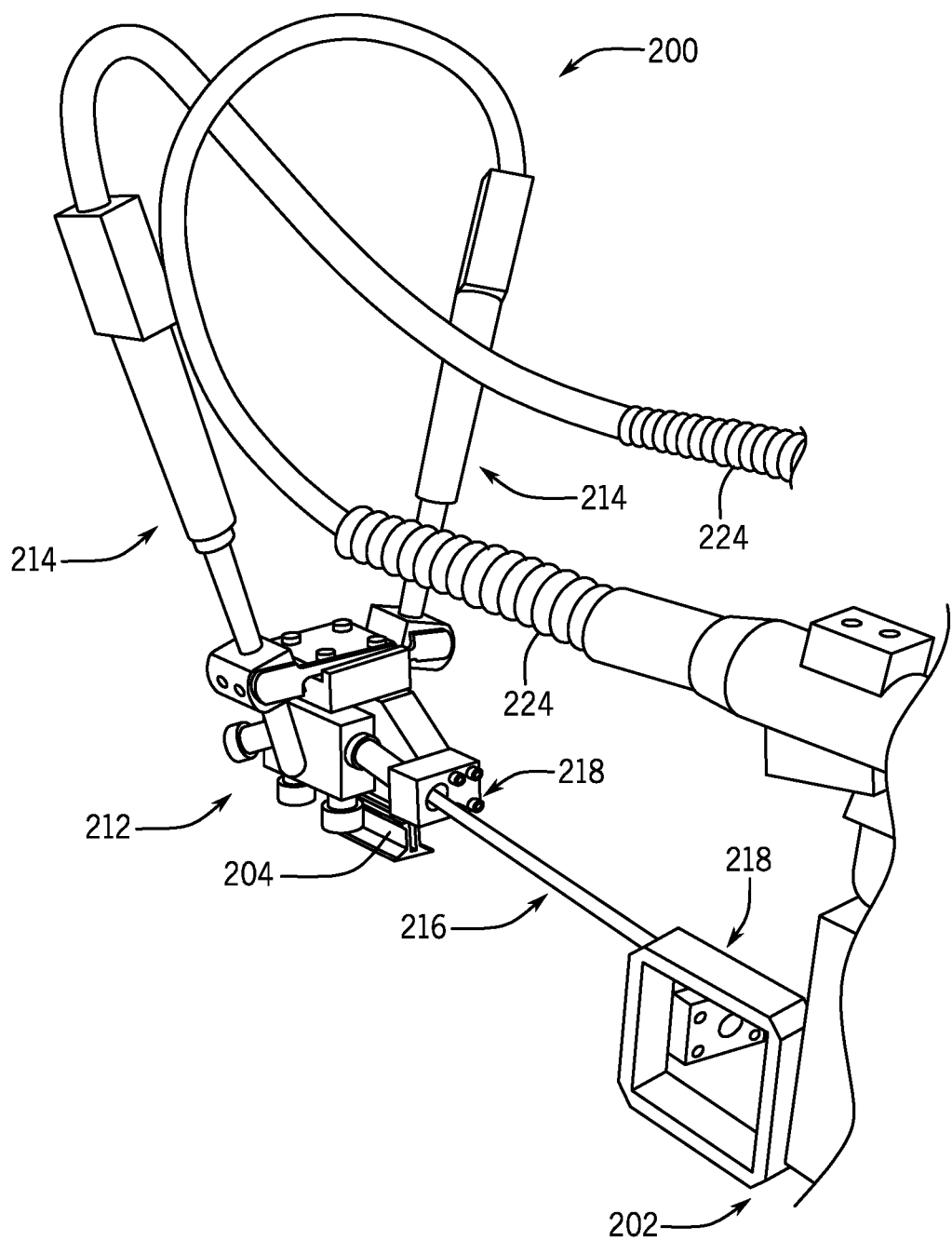
FIG. 7 is a perspective view of an embodiment of the welding system traversing the cap channel, in accordance with aspects of the present disclosure.

FIG. 7 is a perspective view of the trolley 212 traversing a length of cap channel 204 while coupled to the welding machine 202 via the rod 216. The rod 216 couples to the trolley 212 at a first end via the ball and socket interface 218. The rod 216 couples to the welding machine 202 at a second end via the ball and socket interface 218. In the illustrated embodiment, the rod 216 includes a ball at opposing ends of the rod 216, and each of the trolley 212 and the welding machine 202 have a receiving socket. The trolley 212 holds the welding torches 214 in position on each side of the cap channel 204. The welding machine 202 provides power, and in some cases welding consumables (e.g., shielding gas, electrode, etc.) via the welding cables 224.

Figure 8:
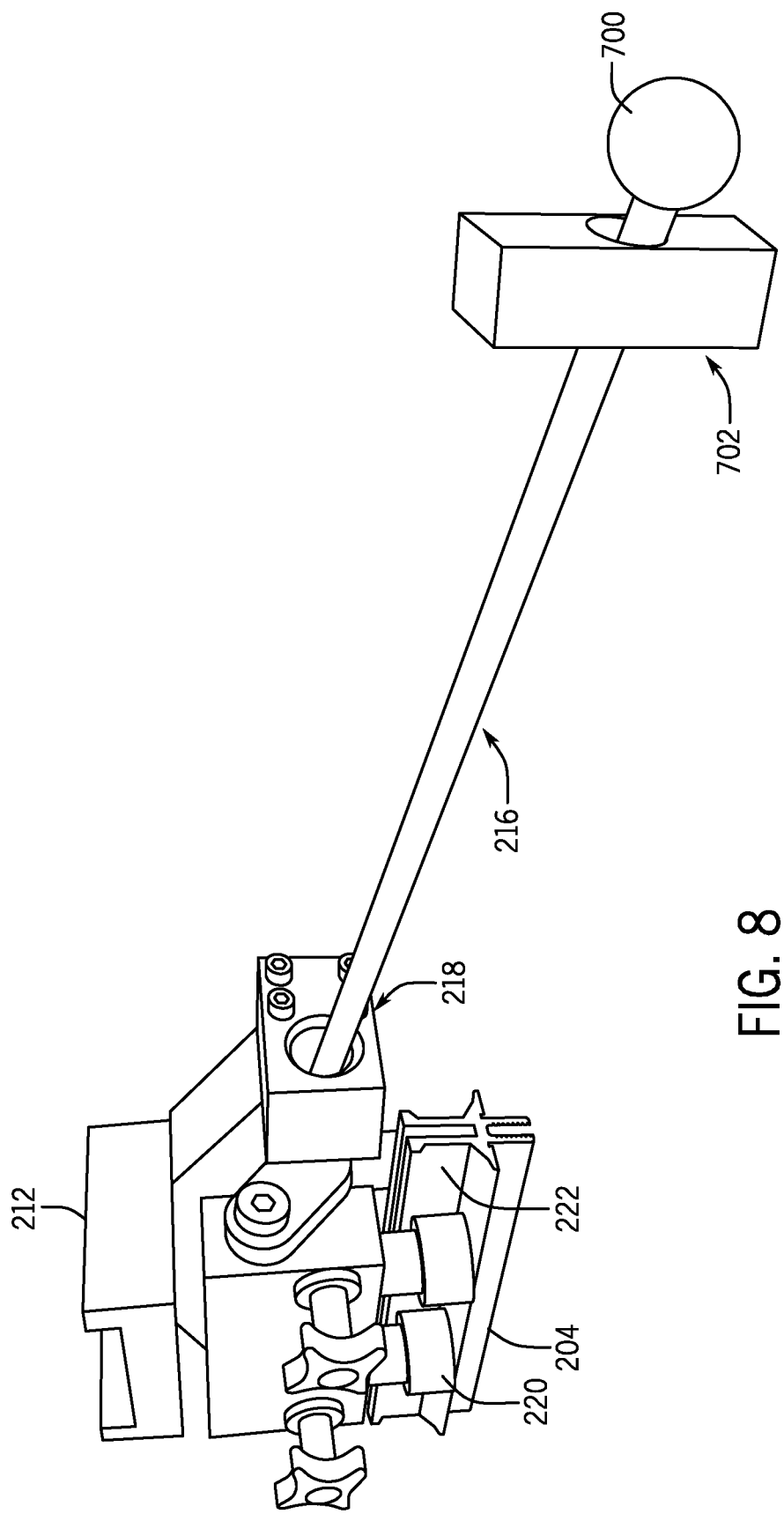
FIG. 8 is a perspective view of an embodiment of a trolley of the welding system coupled to the cap channel, in accordance with aspects of the present disclosure.

FIG. 8 is a perspective view of the trolley 212 coupled to the length of cap channel 204. The rollers 220 of the trolley 212 interface with the roller recesses 222 of the cap channel 204 to couple to trolley 212 to the cap channel 204. The rod 216 may include the ball 700 at one or both ends. If the rod 216 is coupled to the trolley 212 and/or the welding machine via the ball and socket interface 218, the trolley 212 and/or welding machine may include a socket recess for receiving the ball 700. A socket plate 702 is then coupled to the trolley 212 and/or the welding machine capturing the ball 700 and coupling the trolley 212 to the welding machine. The ball and socket interface 218 allows the welding machine to push or pull the trolley 212 along the cap channel 204, but offers some play in the coupling between the welding machine and the trolley 212. The play or engagement in the coupling enables the welding machine to tilt to one side or the other, or stray from the cap channel 204 slightly without affecting the position of the weld bead produced by the welding torches 214.

Figure 9:
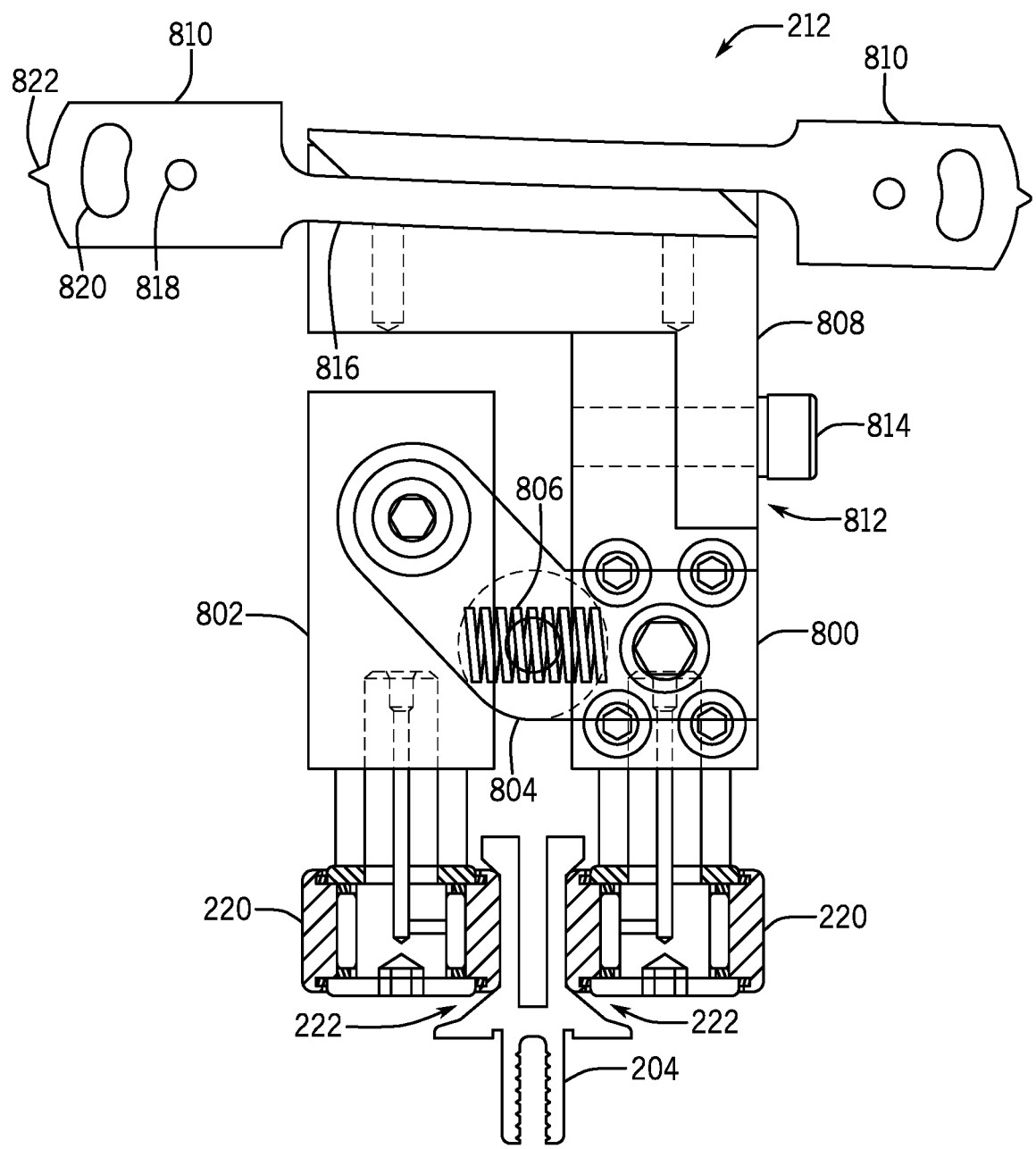
FIG. 9 is a front section view of an embodiment of the trolley coupled to the cap channel, in accordance with aspects of the present disclosure.

FIG. 9 is a front section view of the trolley 212 coupled to the cap channel 204. As shown, the trolley 212 includes a body 800, a side block 802, a pivot arm 804, a spring 806, a top plate 808, and two torch bracket mounts 810. The body 800 and the side block 802 each include rollers 220 configured to interface with respective roller recesses 222 on either side of the cap channel 204. The body 800 and the side block 802 are coupled to one another via the pivot arm 804, which couples to both the body 800 and the side block 802 via a bolted interface, or some other interface. The spring 806 extends between the body 800 and the side block 802, biasing the side block 802 outward relative to (e.g., away from) the body 800. The top plate 808 has a generally L-shaped cross section and couples to the body 800. In the illustrated embodiment, the body 800 includes a recess 812 that is configured to receive a portion of the top plate 808. The top plate 808 then couples to the body 800 via one or more bolts 814. The top plate 808 includes a flat surface 816 to which first and second torch brackets 810 mount.

In the illustrated embodiment, the torch bracket mounts 810 may be designed such that the right and left torch bracket mounts 810 may be of the same design. Each torch bracket mount 810 includes a hinge aperture 818 and a slot 820. When the welding torches are coupled to the trolley 212, the welding torches may be pinned at the hinge aperture 818, allowing the welding torches to pivot. A fastener (e.g., a bolt) may be inserted into the slot, allowing the welding torch to pivot about the hinge aperture 818 within a range of angles defined by the slot 820. The torch bracket mount 810 may also include an angle indicator 822, which may point to angles or marks indicative of angles on the welding torch to indicate the angle at which the welding torch is mounted.

Figure 10:
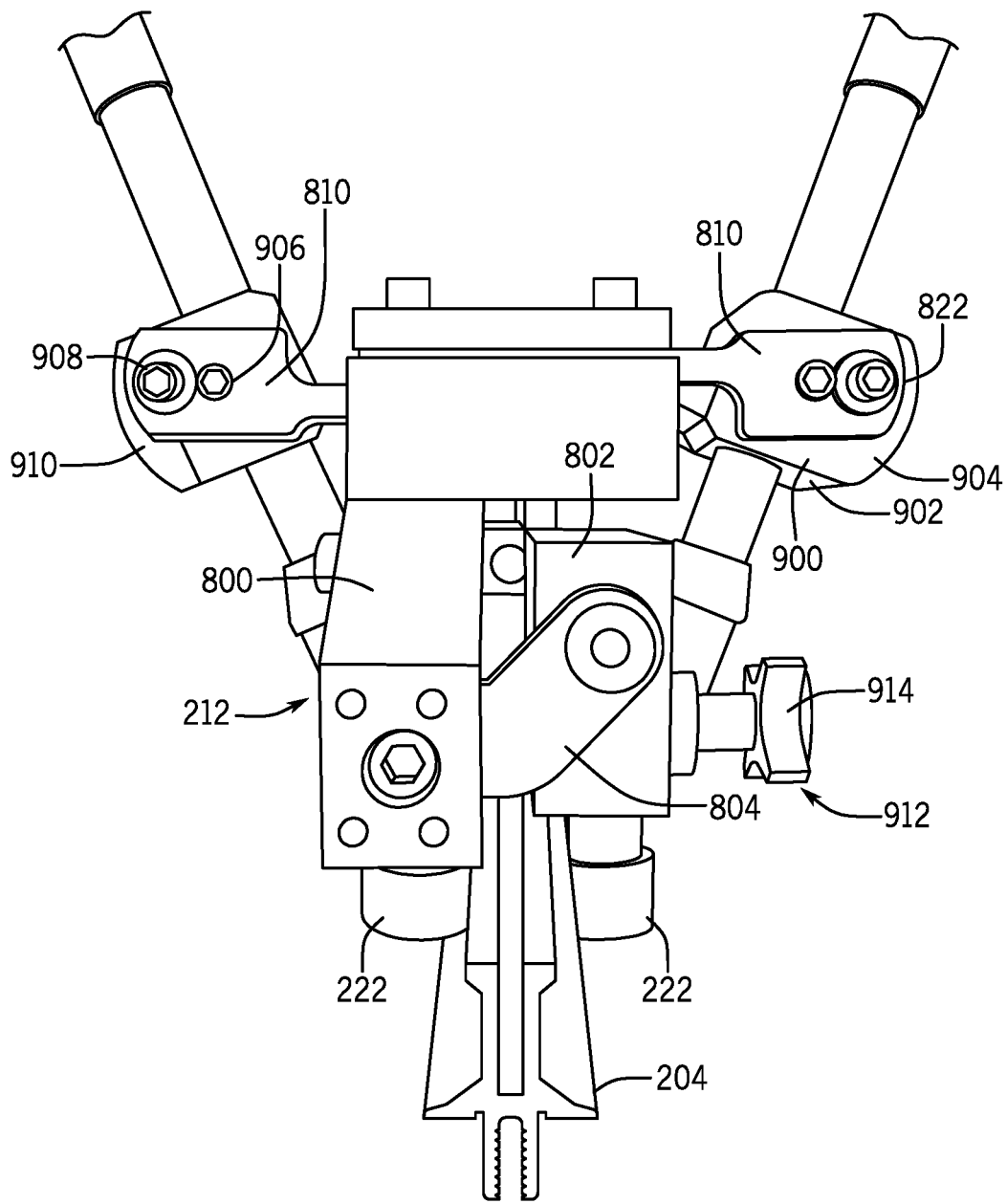
FIG. 10 is a back section view of an embodiment of the trolley coupled to the cap channel with welding torches installed, in accordance with aspects of the present disclosure.

FIG. 10 is a back view of the trolley 212 with welding torches 214 installed. Each of the welding torches 214 includes a weld torch mounting block assembly 900, which in turn includes a weld torch mounting block 902 and a cover plate 904. The weld torch mounting block 902 and the cover plate 904 together define a recess through which the welding torch 214 extends. The welding torch 214 is inserted into the recess and then the cover plate 904 is coupled to the weld torch mounting block 902 (e.g., via a bolted interface) to capture the welding torch. As previously described, a pin or fastener 906 is inserted into the hinge aperture. The welding torch pivots about the pin 906 to adjust the angle of the welding torch 214. A second fastener 908 is inserted into the slot, which controls the range of motion of the welding torch 214. The fastener 908 is tightened to lock the angle of the welding torch 214 into place. The cover plate 904 includes an angle range 910 (e.g., a series of marks) that indicate various angles of the welding torch 214. Specifically, the angle indicator 822 points to a portion of the angle range 910 to indicate the angle of the welding torch 214.

The trolley 212 shown in FIG. 10 also includes an adjustment knob 912 for coupling the trolley 212 to the length of cap channel 204. The adjustment knob 912 may include, for example, a handle 914 and a threaded rod 916. The threaded rod 916 of the adjustment knob 912 extends through the side block 802 (e.g., via a through hole) and couples to the body 800 (e.g., via a pinned eyelet).

FIGS. 11 and 12 illustrate engagement between the trolley 212 and the cap channel 204. FIG. 11 is a front section view of the trolley 212 in an open position. Each of the rollers 220 is generally cylindrical in shape, having an exterior surface 1000 that interfaces with an exterior surface 1002 of the cap channel 204 disposed within the roller recess 222 such that each of the rollers 220 rolls along the roller recess 222. The feet 506 and the protrusion 512 of the cap channel 204 define the roller recess 222 and keep the rollers 220 within the roller recess 222. One or both of a top edge 1004 and a bottom edge 1006 of each roller 220 may be radiused or chamfered. The transition between the exterior surface 1002 of the roller recess 222 and the protrusion 512 and/or the transition between the exterior surface 1002 of the roller recess 222 and the feet 506 may be designed to contour the top edge 1004 and the bottom edge 1006, respectively, and maintain the each roller 220 within the roller recess 222 as the trolley 212 traverses the cap channel 204.

The spring 806 is disposed about the threaded rod 916 and biases the body 800 and the side block 802 away from one another. As illustrated, the body 800 and side block 802 may include first and second respective recesses 1008, 1010 for receiving the spring 806. As the spring 806 attempts to extend itself along the threaded rod 916, the spring 806 applies forces against the body 800 and the side block 802, pushing the body 800 and the side block 802 away from one another.

In some embodiments, the side block 802 may include a pin aperture 1012 configured to receive a pin about which the side block 802 rotates. In such an embodiment, the side block 802 rotates away from and toward the body 800 to open and close the trolley 212. Accordingly, the side block 802 may include a rod aperture 1014 that is sufficiently larger than the threaded rod 916 such that the side block 802 can rotate about the pin aperture 1012 without binding on the threaded rod 916. However, in other embodiments, the side block 802 may move laterally away from and toward the body 800 to open and close the trolley 212.

The adjustment knob 912 may include a bushing 1016 disposed between the handle 914 and the side block 802, to reduce friction between the handle 914 and the side block 802. The threaded rod 916 may include an eyelet 1018 at one end for receiving a pin, allowing the threaded rod to rotate relative to the body 800 as the trolley 212 opens and closes. The handle 914 may have an aperture 1020 having a threaded interior surface configured to interface with the threaded rod 916 such that the handle 914 moves back and forth along the threaded rod 916 when rotated. As the handle 914 rotates about the threaded rod 916, the handle moves back and forth along the threaded rod 916. When the handle 914 moves toward the body 800, the bushing 1016 pushes the side block 802 toward the body 800, compressing the spring 806, moving the rollers 220 toward one another (e.g., coupling the trolley 212 to the cap channel 204). Correspondingly, when the handle 914 moves away from the body 800, the spring 806 pushes the side block 802 away from the body 800, pushing the bushing 1016 toward the handle 914, moving the rollers 220 away from one another (e.g., releasing the trolley 212 from the cap channel 204).

To couple the trolley 212 to the cap channel 204, the handle 914 is rotated to back the handle away from the body 880, allowing the side block 802 to move away from the body 800, opening the trolley 212. The roller(s) coupled to the body 800 may be positioned to mate the exterior surface 1000 of each roller 220 with the exterior surface 1002 of the roller recess 222 of the cap channel 204. The handle 914 may then be rotated to move the side block 802 toward the body 800, thus bringing the roller(s) coupled to the side block 802 toward the roller recess 222 of the cap channel 204. The handle 914 is rotated until the exterior surface 1000 of each roller coupled to the side block 802 mates with the exterior surface 1002 of the roller recess 222 of the cap channel 204, such that the trolley 212 is securely coupled to the cap channel 204.

FIG. 12 shows the trolley 212 in a closed position, coupled to the cap channel 204. As shown, the exterior surface 1000 of each roller 220 coupled to the body 800 is in contact with the exterior surface 1002 of the roller recess 222 of the cap channel 204. Similarly, the exterior surface 1000 of each roller 220 coupled to the side block 802 is in contact with the exterior surface 1002 of the roller recess 222 of the cap channel 204, opposite the roller(s) 220 coupled to the body 800. The rollers 220 roll along the roller recesses 222 of the cap channel 204 as the trolley is pushed or pulled (e.g., by the welding machine via the rod).

Figure 13:
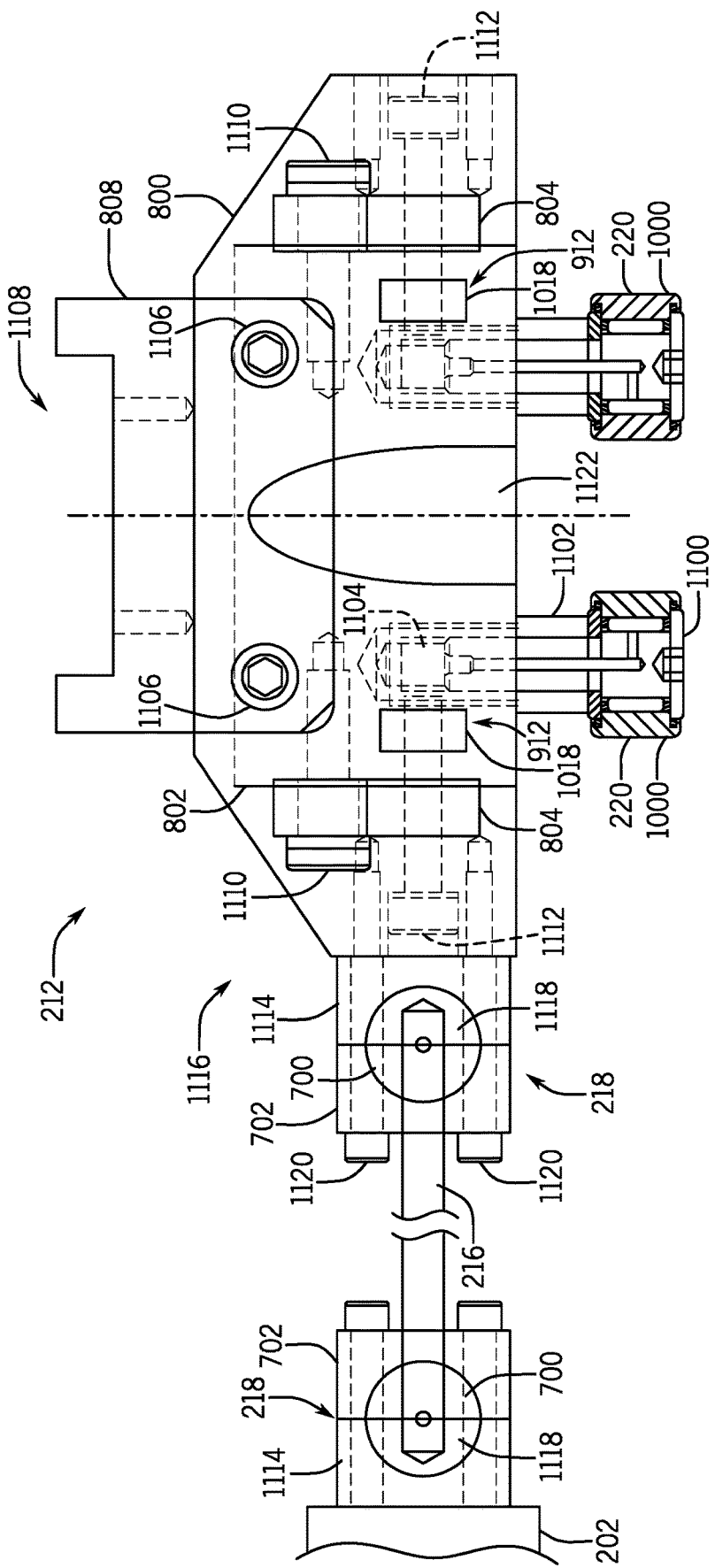
FIG. 13 is a side view of an embodiment of the trolley, in accordance with aspects of the present disclosure.

FIG. 13 is a side view of an embodiment of the trolley 212. As shown, each roller 220 may include a bearing assembly 1100 coupled to a post 1102. Each roller 220 may be coupled to the body 800 or the side block 802 via bolt 1104 or some other fastener. Similarly, the top plate 808 may be coupled to the body 800 via bolts 1106 or other fasteners. The top plate 808 includes a recess 1108 for receiving the torch bracket mounts (elements 810 shown in FIG. 9). The pivot arms 804 are coupled to either side of the side block 802 via bolts 1110. The pivot arms 804 are also coupled to the body 800 via bolts 1112. As shown, the bolts 1112 may extend through the eyelets 1018 of the adjustment knobs 912, acting as a pin about which the adjustment knobs 912 may rotate as the trolley 212 is opened and closed by rotating the adjustment knobs 912.

A socket recess block 1114 may be coupled to the body 800 at one end 1116 of the body. The socket recess block 1114 may define part of a recess 1118 configured to receive the ball 700 of the rod 216. Bolts 1120 or other fasteners may extend through the socket plate 702, through the socket recess block 1114, and into the body 800 to capture the ball 700 and couple the trolley 212 to the welding machine 202 via the rod 2016. Similarly, a corresponding socket recess block 1114 and socket plate 702 may be coupled to the welding machine 202 to capture the ball 700 at the opposite end of the rod 216.

In some embodiments, the body 800 and the side block 802 may each include a torch recess 1122. The torch recess 1122 may be generally tapered in shape at an angle similar to the anticipated angle of the welding torches. The torch recess may allow the welding torches to get closer to the location the interface of the deck sheet and the cap channel.

Figure 14:
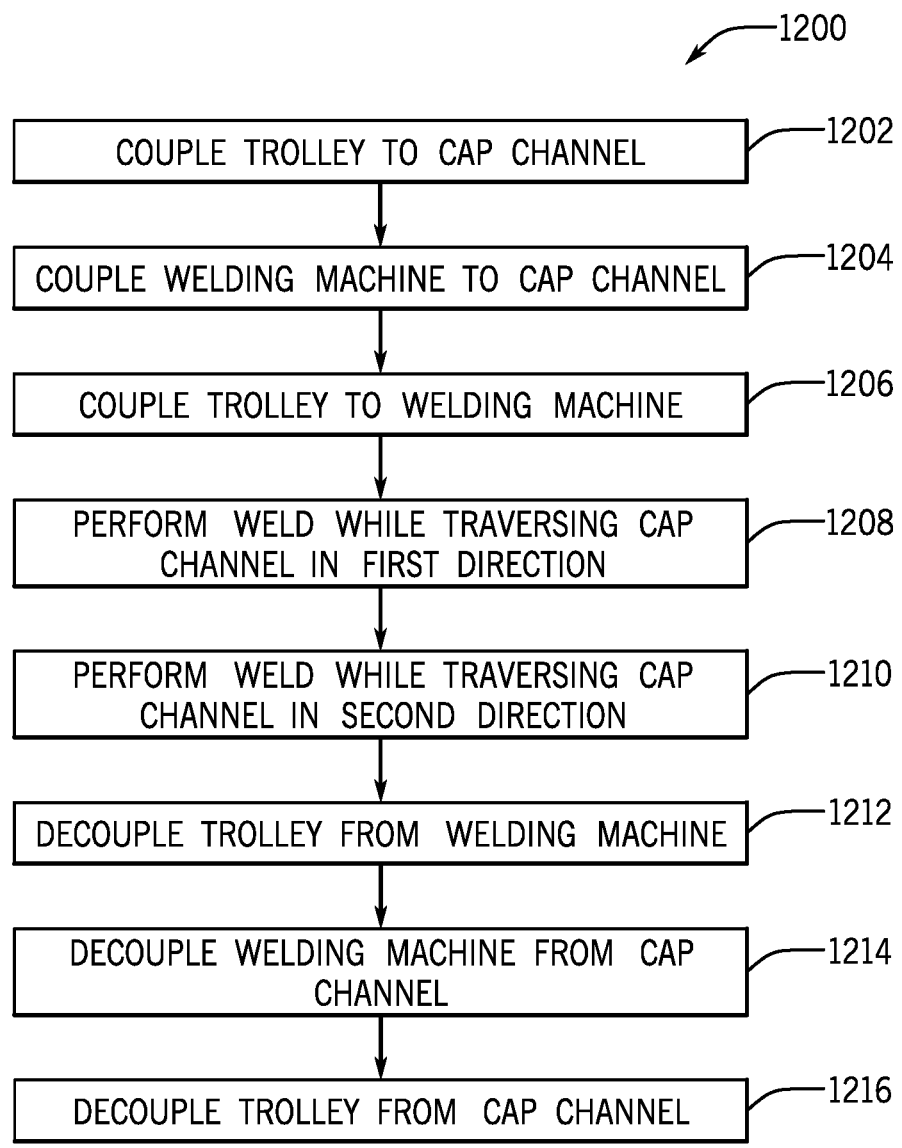
FIG. 14 is a flow chart of a process for performing a weld, in accordance with aspects of the present disclosure.

FIG. 14 is a flow chart of a process 1200 for performing a weld (e.g., using the welding system shown in FIG. 2). At block 1202, the trolley is coupled to the cap channel. As previously described with regard to FIGS. 11 and 12, the roller(s) coupled to the body are engaged with the cap channel such that the exterior surface of each roller contacts the exterior surface of the roller recess of the cap channel. The adjustment knob(s) is then rotated such that the handle travels toward the body along the threaded rod, moving the side block toward the body. The handle is rotated until each roller coupled to the side block contacts the exterior surface of the roller recess opposite the roller(s) coupled to the body, securing the trolley to the cap channel.

At block 1204, the welding machine may be coupled to the cap channel. For example, the guide wheels may be may be disposed within the top channel of the cap channel in order to guide the welding machine along the cap channel. The drive wheels may rest on the deck sheets of the internal floating roof or on the feet of the cap channel.

At block 1206 to trolley is coupled to the welding machine. As discussed with regard to FIG. 13, each of the trolley and the welding machine may include the recess (e.g., defined by a socket recess block) that receives the ball disposed at one end of the rod. The socket plates couple to the welding machine and the trolley to capture the ball at either end of the rod, coupling the trolley and the welding machine to one another. It should be understood, however, that in some embodiments, the welding machine and the trolley may be coupled to one another before one or both of the welding machine and the trolley are coupled to the cap channel.

At block 1208, a first weld is performed on a first side of the cap channel while the welding system traverses the cap channel in a first direction. In some embodiments, the welding machine may push the trolley (e.g., via the drive wheels) along the cap channel while the first weld is performed. In other embodiments, the welding machine may pull the trolley (e.g., via the drive wheels) along the cap channel while the first weld is performed.

At block 1210, a second weld is performed on a second side of the cap channel while the welding system traverses the cap channel in a second direction, opposite the first direction. If the welding machine pushed the trolley while the first weld was performed, the welding machine pulls the trolley while the second weld is performed. If the welding machine pulled the trolley while the first weld was performed, the welding machine pushes the trolley while the second weld is performed.

In the present embodiment, though the welding system may be capable of performing the first and second welds simultaneously as the welding system traverses the cap channel, the first and second welds are performed separately to reduce the amount of heat being introduced to the cap channel, the girder, and the deck sheets. However, embodiments in which the first and second welds are performed simultaneously are also envisioned.

At block 1212, the trolley is decoupled from the welding machine. For example, one or both of the socket plates may be removed to free the rod from the welding machine, the trolley, or both.

At block 1214, the welding machine is decoupled from the cap channel. In some embodiments, decoupling the welding machine from the cap channel may be as simple as lifting the welding machine to remove the guide wheels from the top channel of the cap channel. In other embodiments, a latch, set screw, or some other coupling mechanism may be released to free the welding machine from the cap channel.

At block 1216, the trolley is decoupled from the cap channel. As discussed with regard to FIGS. 11 and 12, the handle of the adjustment knob may be rotated to move the side block away from the body, opening the trolley and disengaging the roller(s) coupled to the side block from the roller recess of the cap channel. Once the trolley has been opened enough that the protrusions of the cap channel can pass between the rollers, the trolley may be removed from the cap channel. Though in the instant embodiment, the trolley and the welding machine are decoupled from one another before decoupling each from the cap channel, it should be understood that in some embodiments, the trolley and the welding machine may be decoupled from the cap channel before being decoupled from one another.

It should be understood that while the disclosed embodiments involve welding deck seams of internal floating roofs, that the disclosed techniques may be used in welding applications beyond internal floating roofs for fluid storage tanks. Accordingly, the described embodiments are not intended to limit the disclosed techniques to welding deck seams of internal floating roofs for fluid storage tanks. Indeed, the disclosed techniques may be used in a wide range of welding applications.

The disclosed techniques include an automatic welding system for welding deck seams of an internal floating roof of a storage tank and a process of using such a system. Specifically the welding system may include an automatic welding machine and a trolley coupled to one another via a rod and ball and socket interfaces. The trolley may be configured to couple to a length of cap channel and position welding torches on either side of a cap channel at the interface of the cap channel and the deck sheet. The trolley may include, for example, a body and a side block coupled to one another by a pivot arm and a spring that biases the body and the side block away from one another. Rollers may be coupled to both the body and the side block and are configured to interface with roller recesses on either side of the cap channel. An adjustment knob may extend through the body and the side block and control the positon of the side block relative to the body. Torch bracket mounts coupled to the body may adjustably position the welding torches on either side of the cap channel. The ball and socket interface allows the welding machine to push or pull the trolley along the length of cap channel, but offers a degree of freedom so that flexing of the deck sheets underneath the welding machine, leaning of the welding machine, or drifting of the welding machine to not affect the position of the welding torches or the quality of the resulting weld.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A welding system, comprising:
    a welding machine, comprising:
        a first welding torch configured to weld a first deck sheet to a length of a cap channel;
        a plurality of guide wheels configured to roll along a top channel of the length of the cap channel; and
        a drive wheel configured to roll along the first deck sheet and to propel the welding machine along the length of the cap channel;
    a trolley, comprising:
        a body;
        a first plurality of rollers coupled to the body and configured to roll along a first roller recess on a first side of the length of the cap channel;
        a side block coupled to a pivot arm of the body via a pin, wherein the side block is configured to rotate about the pin;
        a spring disposed between the body and the side block;
        a second plurality of rollers coupled to the side block and configured to roll along a second roller recess on a second side of the length of the cap channel;
        an adjustment knob configured to adjust a position of the side block relative to the body; and
        a first welding torch bracket configured to position the first welding torch to perform a first weld at a first interface between the first side of the length of the cap channel and the first deck sheet as the welding system traverses the length of the cap channel; and
    a coupling rod extending between the welding machine and the trolley and coupled to the welding machine and the trolley via first and second respective ball and socket interfaces.

2. The welding system of claim 1, wherein the welding machine comprises a second welding torch configured to weld a second deck sheet to the length of the cap channel, wherein the trolley comprises a second welding torch bracket configured to position the second welding torch to perform a second weld at a second interface between the second side of the length of the cap channel and the second deck sheet as the welding system traverses the length of the cap channel.

3. The welding system of claim 1, wherein the welding machine comprises a controller configured to control welding power output to the first welding torch, welding consumables output to the first welding torch, or a combination thereof.

4. The welding system of claim 3, wherein the controller is configured to control the drive wheel.

5. The welding system of claim 1, comprising a pendant configured to receive inputs from a user to control the welding system.

6. The welding system of claim 5, wherein the pendant is configured to couple to a housing of the welding machine.

7. The welding system of claim 1, wherein the second ball and socket interface comprises:
    a ball at a first end of the coupling rod;
    a socket recess block coupled to the body and defining a recess configured to receive the ball; and
    a socket plate configured to couple to the socket recess block and to capture the ball within the recess.

8. A trolley, comprising:
    a body;
    a first plurality of rollers coupled to the body and configured to roll along a first roller recess on a first side of a length of a cap channel;
    a side block coupled to a pivot arm of the body via a pin, wherein the side block is configured to rotate about the pin;
    a spring disposed between the body and the side block;
    a second plurality of rollers coupled to the side block and configured to roll along a second roller recess on a second side of the length of the cap channel; and
    an adjustment knob configured to adjust a position of the side block relative to the body;
    a first welding torch bracket configured to position a welding torch at a first interface between the first side of the length of the cap channel and a first deck sheet as the trolley traverses the length of the cap channel; and
    a socket recess block defining a recess configured to receive a ball of a coupling rod, wherein the coupling rod couples the trolley to a welding machine.

9. The trolley of claim 8, comprising a second welding torch bracket configured to position a second welding torch to perform a second weld at a second interface between the second side of the length of the cap channel and a second deck sheet as the trolley traverses the length of the cap channel.

10. The trolley of claim 8, comprising a socket plate configured to capture the ball of the coupling rod within the recess.

11. The trolley of claim 8, wherein the pin is a first pin, and the adjustment knob comprises:
    a threaded rod, wherein the threaded rod comprises an eyelet at a first end, wherein the threaded rod is coupled to the body via a second pin extending through the eyelet;
    a bushing disposed about the threaded rod; and
    a handle comprising an aperture having a threaded interior surface configured to interface with a threaded exterior surface of the threaded rod.

12. The trolley of claim 11, wherein the spring is disposed about the threaded rod and biases the side block away from the body.

13. The trolley of claim 8, wherein each of the first plurality of rollers and each of the second plurality of rollers comprises a bearing and a post.

14. The trolley of claim 8, comprising a top plate disposed between the body and the first welding torch bracket.

15. A trolley, comprising:
    a body;
    a first plurality of rollers coupled to the body and configured to roll along a first roller recess on a first side of a length of a cap channel;
    a side block coupled to the body via a pivot arm and a spring, wherein the side block is coupled to the pivot arm via a first pin, and wherein the side block is configured to rotate about the first pin;

a second plurality of rollers coupled to the side block and configured to roll along a second roller recess on a second side of the length of the cap channel; and
an adjustment knob configured to adjust a position of the side block relative to the body, wherein the adjustment knob comprises:
 a threaded rod, wherein the threaded rod comprises an eyelet at a first end, wherein the threaded rod is coupled to the body via a second pin extending through the eyelet;
 a bushing disposed about the threaded rod; and
 a handle comprising an aperture having a threaded interior surface configured to interface with a threaded exterior surface of the threaded rod;
a first welding torch bracket configured to position a first welding torch at a first interface between the first side of the length of the cap channel and a first deck sheet as the trolley traverses the length of the cap channel; and a socket recess block defining a recess configured to receive a ball of a coupling rod, wherein the coupling rod is configured to couple the trolley to a welding machine.

16. The trolley of claim 15, comprising a second welding torch bracket configured to position a second welding torch at a second interface between the second side of the length of the cap channel and a second deck sheet as the trolley traverses the length of the cap channel.

17. The trolley of claim 15, comprising a socket plate configured to capture the ball of the coupling rod within the recess.

18. The trolley of claim 15, wherein the spring is disposed about the threaded rod and is configured to bias the side block away from the body.

\* \* \* \* \*